US009386526B2

(12) United States Patent
Wang et al.

(10) Patent No.: US 9,386,526 B2
(45) Date of Patent: Jul. 5, 2016

(54) METHODS AND APPARATUS FOR DETERMINING AND ENTERING POWER SAVING MODE IN A WIRELESS NETWORK

(75) Inventors: Yu Wang, San Diego, CA (US);
Kuo-Chun Lee, San Diego, CA (US);
Guangming Shi, San Diego, CA (US);
Tom Chin, San Diego, CA (US); Ta-yan Siu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 749 days.

(21) Appl. No.: 13/286,087

(22) Filed: Oct. 31, 2011

(65) Prior Publication Data

US 2013/0107774 A1    May 2, 2013

(51) Int. Cl.
*H04L 12/28* (2006.01)
*H04W 52/02* (2009.01)
*H04J 1/16* (2006.01)

(52) U.S. Cl.
CPC ............ *H04W 52/0232* (2013.01); *Y02B 60/50* (2013.01)

(58) Field of Classification Search
USPC .................................. 370/252, 311, 329, 386
See application file for complete search history.

(56) References Cited

U.S. PATENT DOCUMENTS

| 6,829,493 | B1 | 12/2004 | Hunzinger |
| 7,447,526 | B2 | 11/2008 | Kim et al. |
| 7,450,926 | B2 | 11/2008 | Chang et al. |
| 7,526,288 | B2 | 4/2009 | Eom et al. |
| 7,787,406 | B2 | 8/2010 | Park et al. |
| 8,755,313 | B2 | 6/2014 | Damnjanovic et al. |
| 2004/0266386 | A1 | 12/2004 | Kuo |
| 2008/0009328 | A1 | 1/2008 | Narasimha |
| 2008/0039032 | A1* | 2/2008 | Haumont .................. 455/115.1 |
| 2009/0201871 | A1* | 8/2009 | Sambhwani ...... H04W 72/0406 370/329 |
| 2009/0279467 | A1 | 11/2009 | Ji |
| 2013/0039339 | A1* | 2/2013 | Rayavarapu et al. ......... 370/331 |

FOREIGN PATENT DOCUMENTS

| JP | 2011501556 A | 1/2011 |
| KR | 20110000479 A | 1/2011 |
| KR | 20110006949 A | 1/2011 |
| KR | 20110102589 A | 9/2011 |
| WO | WO-2008086532 | 7/2008 |
| WO | WO-2009051458 A2 | 4/2009 |

OTHER PUBLICATIONS

International Search Report and Written Opinion—PCT/US2012/059507—ISA/EPO—Jan. 28, 2013.

(Continued)

*Primary Examiner* — John Pezzlo
(74) *Attorney, Agent, or Firm* — Chui-kiu Teresa Wong; Paul Holdaway

(57) ABSTRACT

Certain aspects of the present disclosure present methods and apparatus for selecting a power saving mode for a mobile station (MS) in a wireless network. The power saving mode may be selected based on the traffic that is observed at the MS in a predefined duration. Once low overall data traffic is observed, the device may enter a first low power state. If data traffic of a particular type (e.g., not for management or maintenance purposes) is not observed for a predetermined duration, the device may enter a second low power state (deeper than the first low power state).

18 Claims, 6 Drawing Sheets

(56) References Cited

OTHER PUBLICATIONS

Kim, R. et al., "Advanced Power Management Techniques in Next-Generation Wireless Networks," IEEE Communications Magazine, vol. 48, No. 5, pp. 94-102, May 2010.

Kong, L. et al., "Performance Study and System Optimization on Sleep Mode Operation in IEEE 802.16e," IEEE Transactions on Wireless Communications, 8(9), Sep. 2009, pp. 4518-4528.

Taiwan Search Report—TW101138101—TIPO—Dec. 16, 2014.

* cited by examiner

METHODS AND APPARATUS FOR DETERMINING AND ENTERING POWER SAVING MODE IN A WIRELESS NETWORK

TECHNICAL FIELD

Certain aspects of the present disclosure generally relate to wireless communications and, more particularly, to energy efficiency of wireless networks through the use of power saving modes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for selecting a power saving mode in a wireless communication network. The method generally includes monitoring data traffic in the network, if low data traffic is observed, determining whether there is any real data traffic during a predefined duration, entering sleep mode if any real data traffic is observed during the predefined duration, entering idle mode if no real data traffic is observed during the predefined duration.

Certain aspects of the present disclosure provide an apparatus for selecting a power saving mode of a wireless device. The apparatus generally includes means for monitoring data traffic in the network, means for determining, during periods of low overall data traffic, if a particular type of data traffic is observed during a predetermined duration, and means for deciding whether to trigger entry a first low power state or a second low power state based on the determination.

Certain aspects of the present disclosure provide an apparatus for selecting a power saving mode of a wireless device. The apparatus generally includes at least one processor configured to monitor data traffic in the network, determine, during periods of low overall data traffic, if a particular type of data traffic is observed during a predetermined duration, and decide whether to trigger entry a first low power state or a second low power state based on the determination; and a memory coupled with the at least one processor.

Certain aspects of the present disclosure provide a computer program product comprising a computer readable medium having instructions stored thereon. The instructions are generally executable by one or more processors for monitoring data traffic in the network, determining, during periods of low overall data traffic, if a particular type of data traffic is observed during a predetermined duration, and deciding whether to trigger entry a first low power state or a second low power state based on the determination.

BRIEF DESCRIPTION OF THE DRAWINGS

So that the manner in which the features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
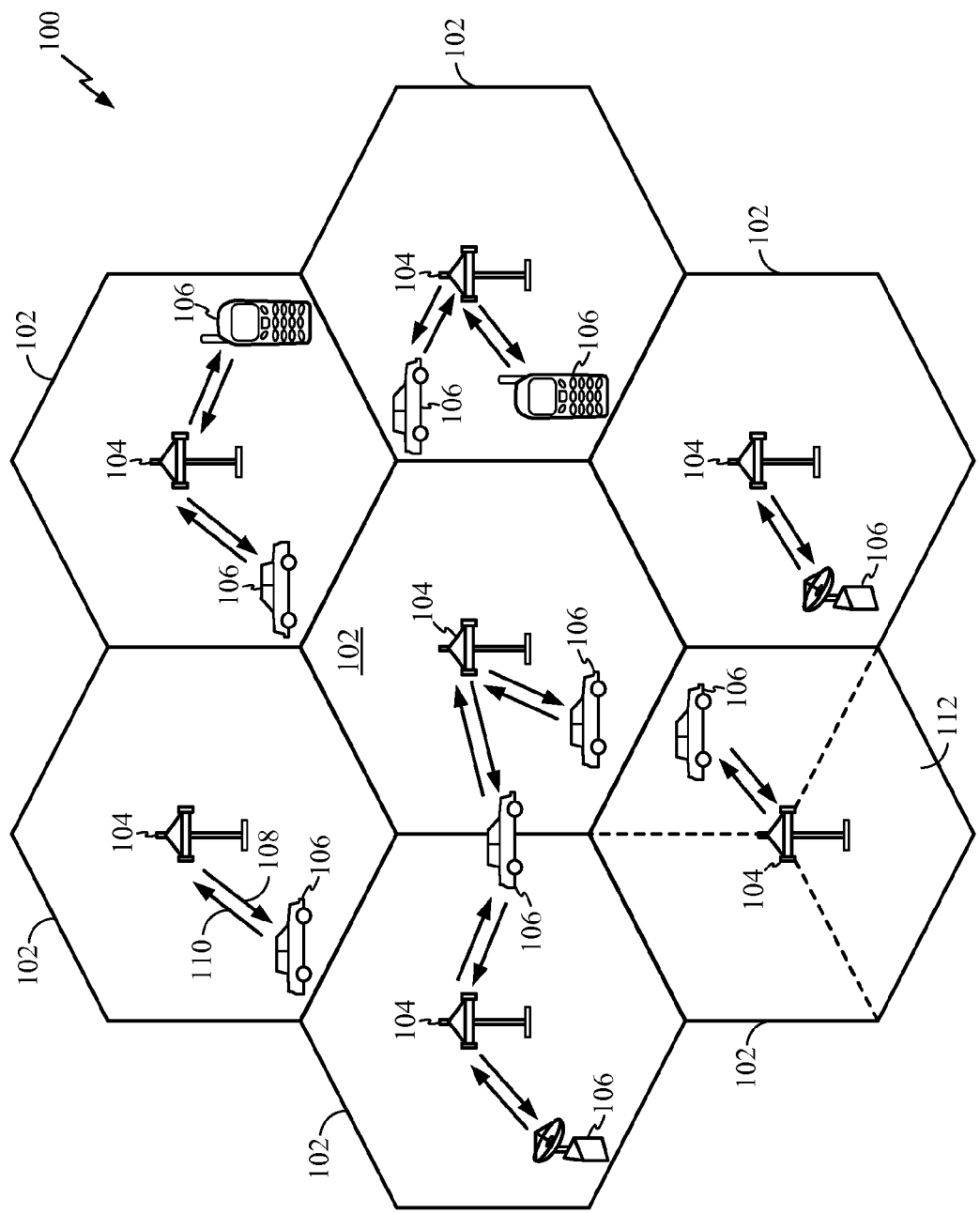
FIG. 1 illustrates an example wireless communication system, in accordance with certain aspects of the present disclosure.

Certain aspects are described herein with reference to the drawings, wherein like reference numerals are used to refer to like elements throughout. In the following description, for purposes of explanation, numerous specific details are set forth in order to provide a thorough understanding of certain aspects. However, it may be that such aspect(s) can be practiced without these specific details. In other instances, well-known structures and devices are shown in block diagram form in order to facilitate describing certain aspects.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

The institute of electrical and electronics engineers (IEEE) 802.16 is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

As those skilled in the art will readily appreciate from the detailed description to follow, the various concepts presented herein are well suited for WiMax applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), LTE, IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

FIG. 1 illustrates an example of a wireless communication system 100 in which certain aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. User terminals 106 may be fixed (i.e., stationary) or mobile. User terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

Cell 102 may be divided into multiple sectors 112. Sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
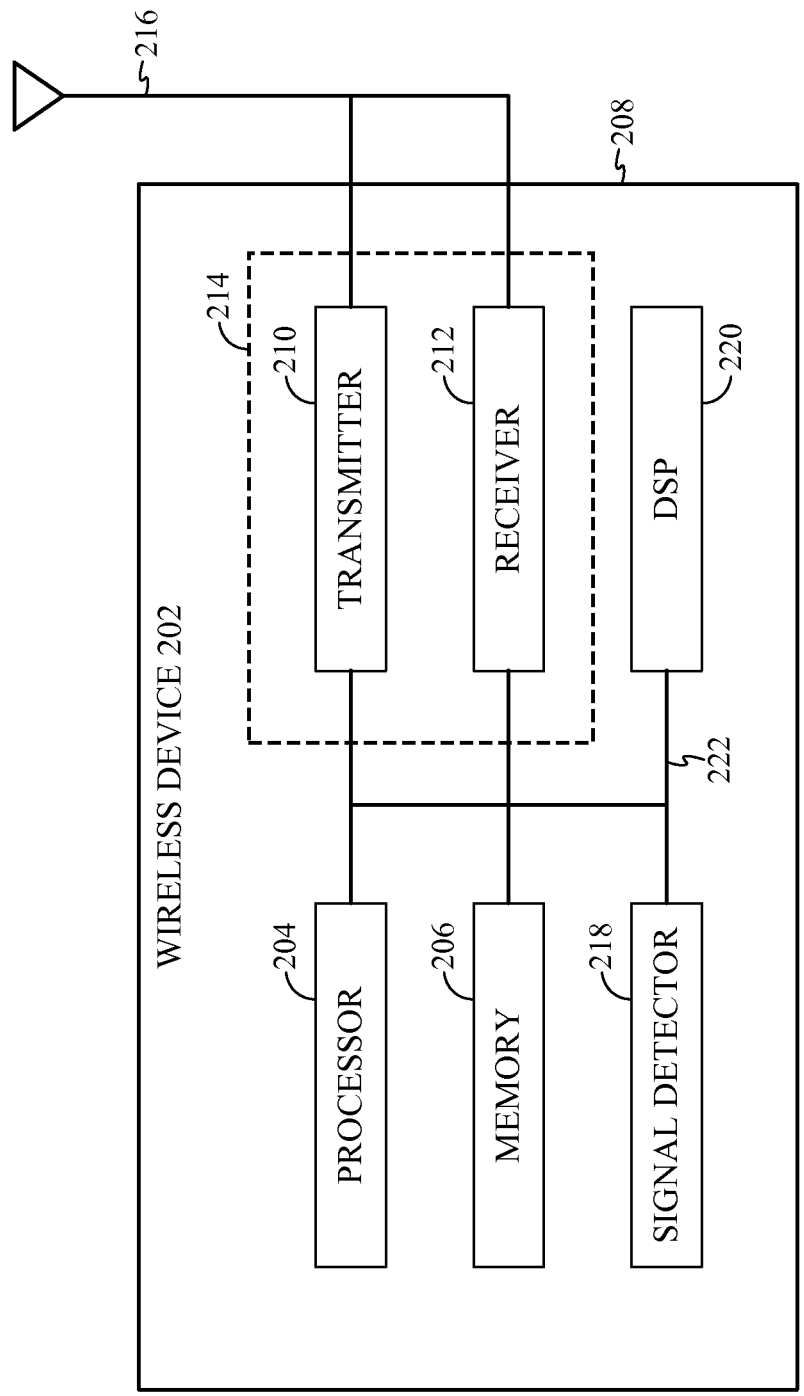
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to processor 204. A portion of memory 206 may also include non-volatile random access memory (NVRAM). Processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
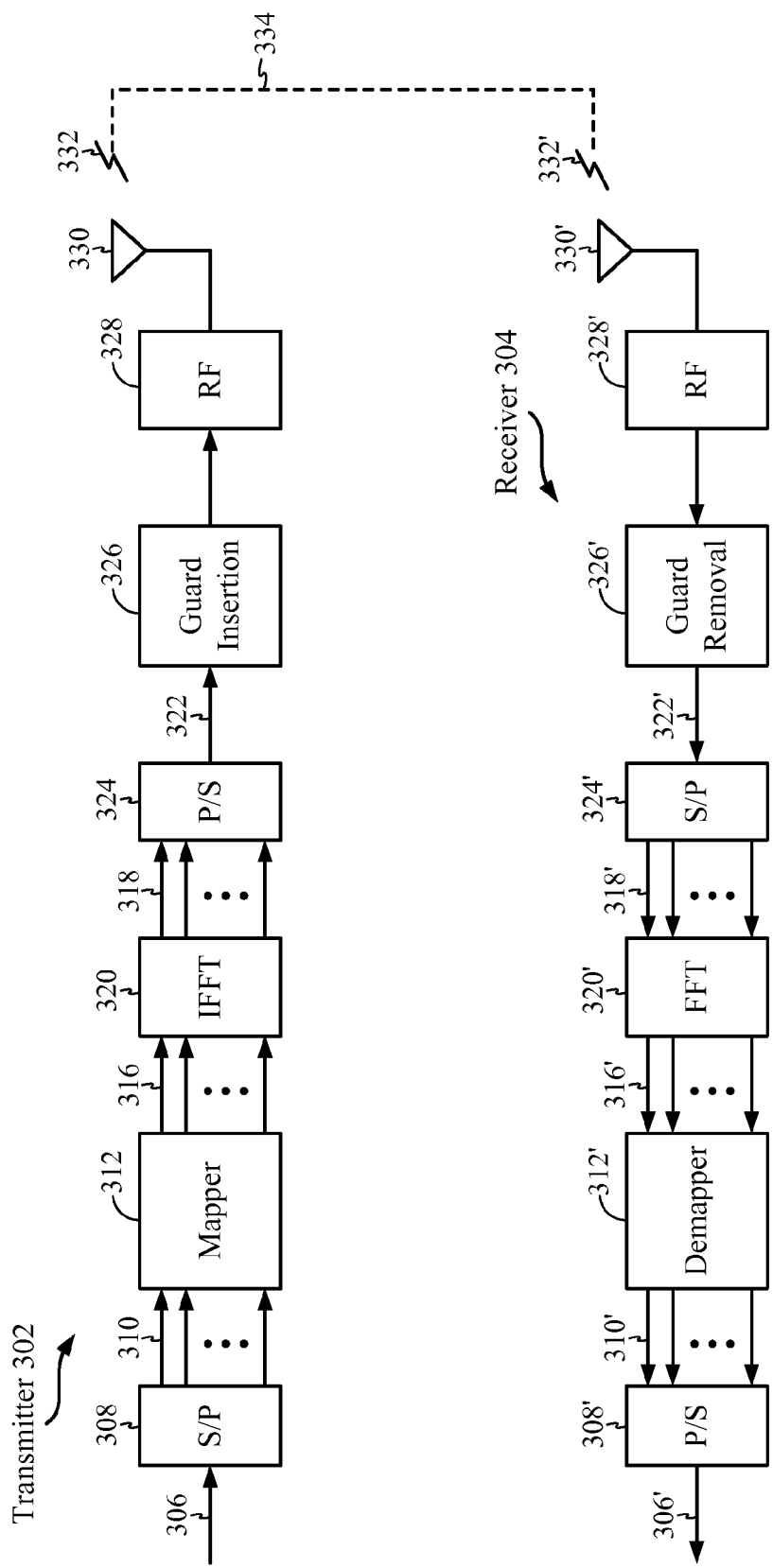
FIG. 3 illustrates an example transmitter and an example receiver that may be used within a wireless communication system that utilizes orthogonal frequency-division multiplexing/multiple access (OFDM/OFDMA) technology in accordance with certain aspects of the present disclosure.

FIG. 3 illustrates an example of a transmitter 302 that may be used within a wireless communication system 100 that utilizes OFDM/OFDMA. Portions of transmitter 302 may be implemented in transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), and the like. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor.

An Example Method for Determining and Entering Power Saving Mode in a Wireless Network Certain aspects of the present disclosure present methods and apparatus for selecting a power saving mode for a mobile station (MS) in a wireless network. The power saving mode may be selected based on the amount and type of traffic that is observed at the MS during a predefined period of time.

The technique provided herein may be used in a variety of wireless networks that have different levels of power savings states.

For example, in order to reduce power consumption of a mobile station in a wireless network (e.g., WiMAX), various wireless standards (e.g., IEEE 802.16e) may define multiple power savings states. For example a first low power state may correspond to a sleep mode in which one or more components are powered down for some percentage of time, which may be referred to as a sleep window or "unavailable" period. A second low power state may correspond to a deeper low power state, in which additional components are powered down and/or components are powered down for a longer time relative to the first low power state. Other wireless network protocols may have similar levels or degrees of lower power states.

Certain aspects of the present disclosure propose methods for selecting between first and second low power states (e.g., sleep mode or idle mode) for an MS when traffic is light. In general, either a serving base station (BS) or the mobile station may trigger a power saving mode.

Figure 4:
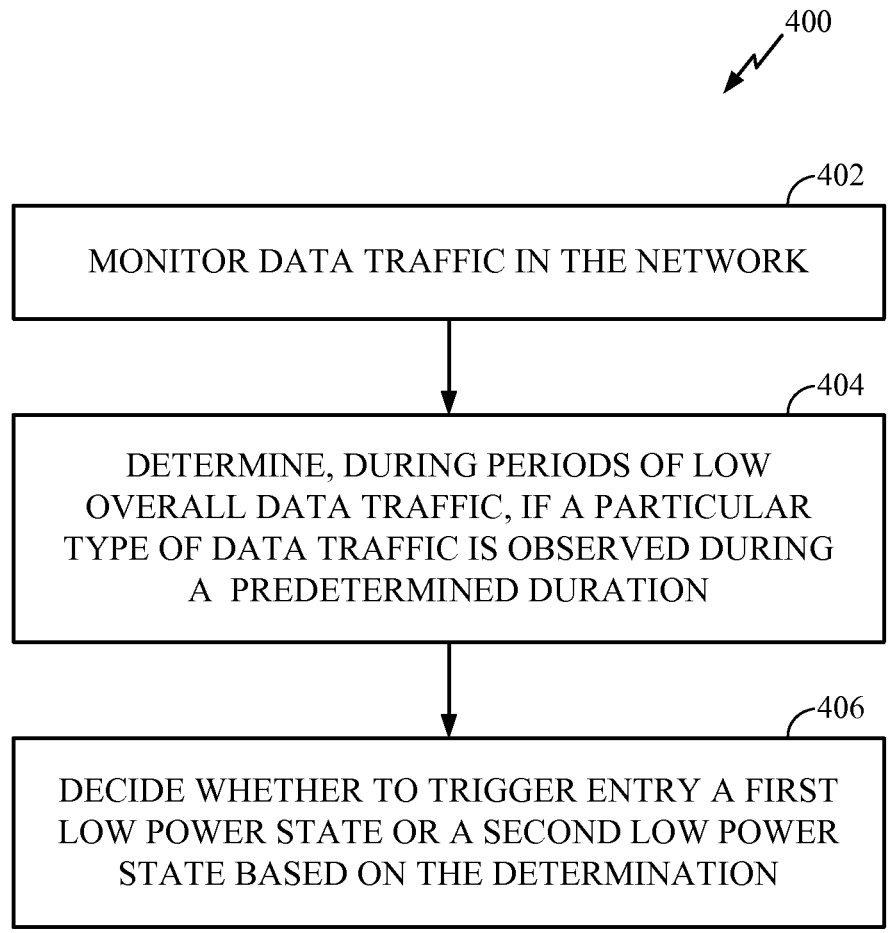
FIG. 4 illustrates example operations for selecting a power saving mode in a wireless network, in accordance with certain aspects of the present disclosure.

FIG. 4 illustrates example operations 400 for selecting between low power states for an MS. As noted above, the operations may be performed by an MS or by a serving BS. For example, a serving BS may make select the low power state for the MS and then instruct the MS to enter the selected low power state.

The operations begin, at 402, by monitoring data traffic in the network. At 404, it is determined, during periods of low overall data traffic, if a particular type of data traffic is observed during a predetermined duration. At 406, a decision is made whether to trigger entry a first low power state or a second low power state, based on the determination.

The type of traffic may corresponding "real data traffic" referring to data traffic that is not for maintenance or management purposes (control traffic).

In some wireless standards such as WiMAX, a connection identification (CID) may be used to identify the physical traffic path between a MS and a BS. The real data traffic (e.g., excluding the traffic directed to management and maintenance purposes) may be identified by uplink (UL) and downlink (DL) data traffic CIDs, including unicast and multicast data traffic. Using CIDs, certain aspects decide how to trigger MS-initiated sleep mode or idle mode.

During a time period, the MS may observe no data traffic or the data traffic may be low. The MS may periodically check if there is any valid downlink or uplink unicast or multicast CIDs in a predefined period of time. For certain aspects, if the MS observes any DL/UL unicast or multicast CIDs during the predefined period of time, the MS may trigger a MS-initiated sleep mode. If during the predefined period of time the MS does not observe any DL/UL unicast or multicast CIDs, the MS may trigger a MS-initiated idle mode.

Figure 5:
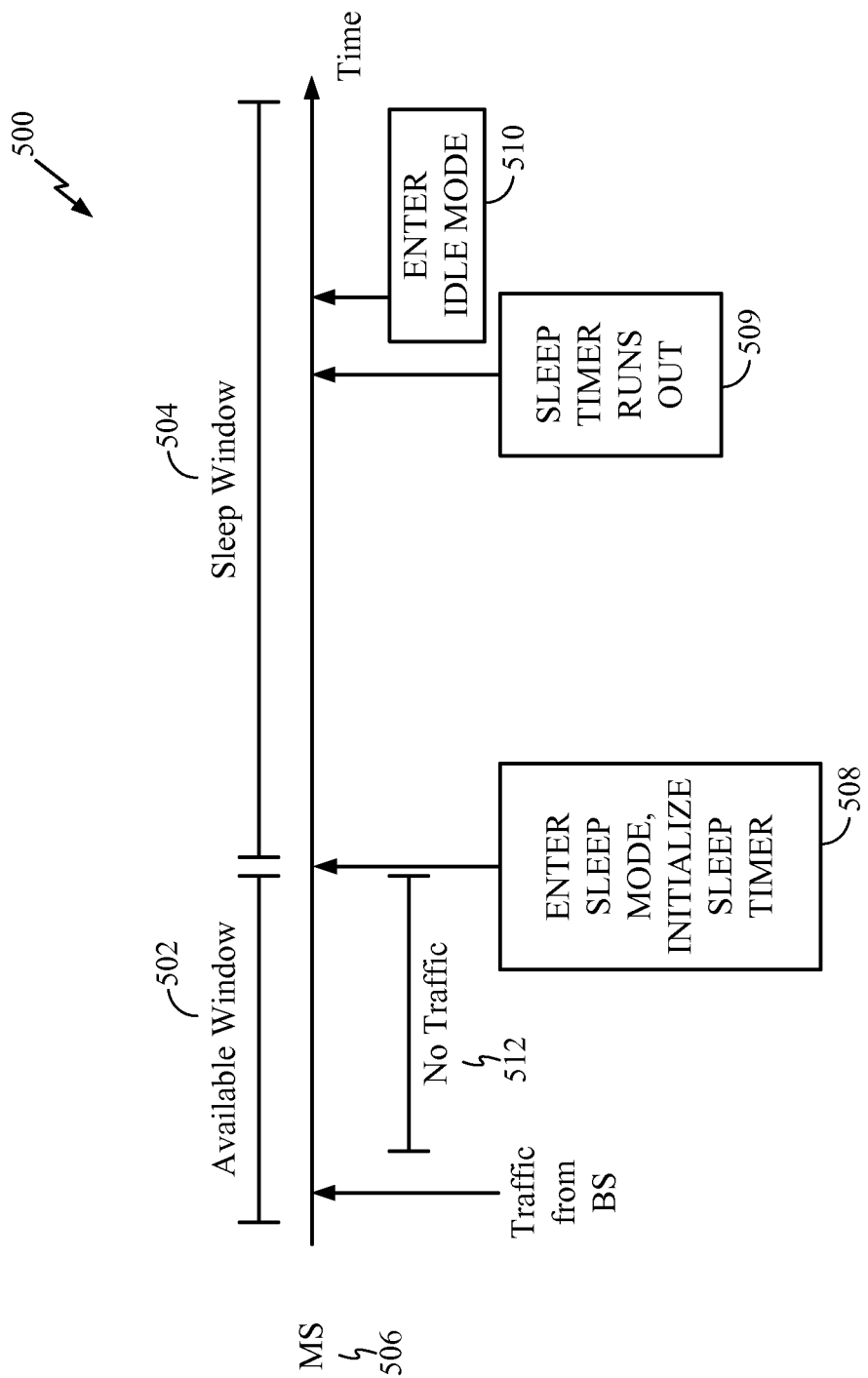
FIG. 5 illustrates example activity of a mobile station in time, in accordance with certain aspects of the present disclosure.

FIG. 5 illustrates example timing diagram 500 for an MS, with low power states selected in accordance with certain aspects of the present disclosure.

As illustrated, the MS 506 may be available to receive data traffic from a BS (e.g., during available window 502). After some time is passed with no real data traffic from the BS (e.g., 512), the MS may initiate a sleep mode. For certain aspects, when the MS enters a sleep mode, the MS may start a sleep timer 508. The sleep timer can be configured to run for a predefined period. If sleep mode is deactivated at any time before the sleep timer runs out, the sleep timer may be deleted. If sleep mode is not deactivated and the sleep timer runs out after the predefined period (e.g., 509), the MS may trigger an idle mode 510.

For another aspect, while the sleep timer is running, the MS may keep track of size of the sleep window 504 (e.g., the window in which the MS is unavailable). If size of the sleep window is continuously increased for certain number of times, the MS may delete the sleep timer and trigger the idle mode. In general, each time size of the sleep window may be increased by a fixed or a variable amount. For instance, a counter may be used to keep track of the number of times that size of the sleep window is increased. The counter may add one to its previous value each time size of the sleep window is increased. If the counter reaches a predefined threshold, the MS may start a procedure to trigger the idle mode. The counter may be reset to zero when size of the sleep window is decreased.

In some cases, a low power state may be selected based on a parameter that represents an amount of time a device is in a low power state (with components powered down) to a time the device is awake and listening.

For example, a sleep ratio may be defined for each sleep cycle, as follows:

$$s_r = \frac{s_w}{l_w + s_w}$$

where $s_r$ is the sleep ratio, $l_w$ is the size of the listening window (e.g., the window of time that the MS is available) and $s_w$ is the size of the sleep window (e.g., the window of time that the MS is unavailable).

If an MS is in sleep mode and the sleep ratio is above a threshold (for example, 95%) during a predefined period of time, the MS may trigger the idle mode (e.g., go into a deep sleep to save more power).

Figure 6:
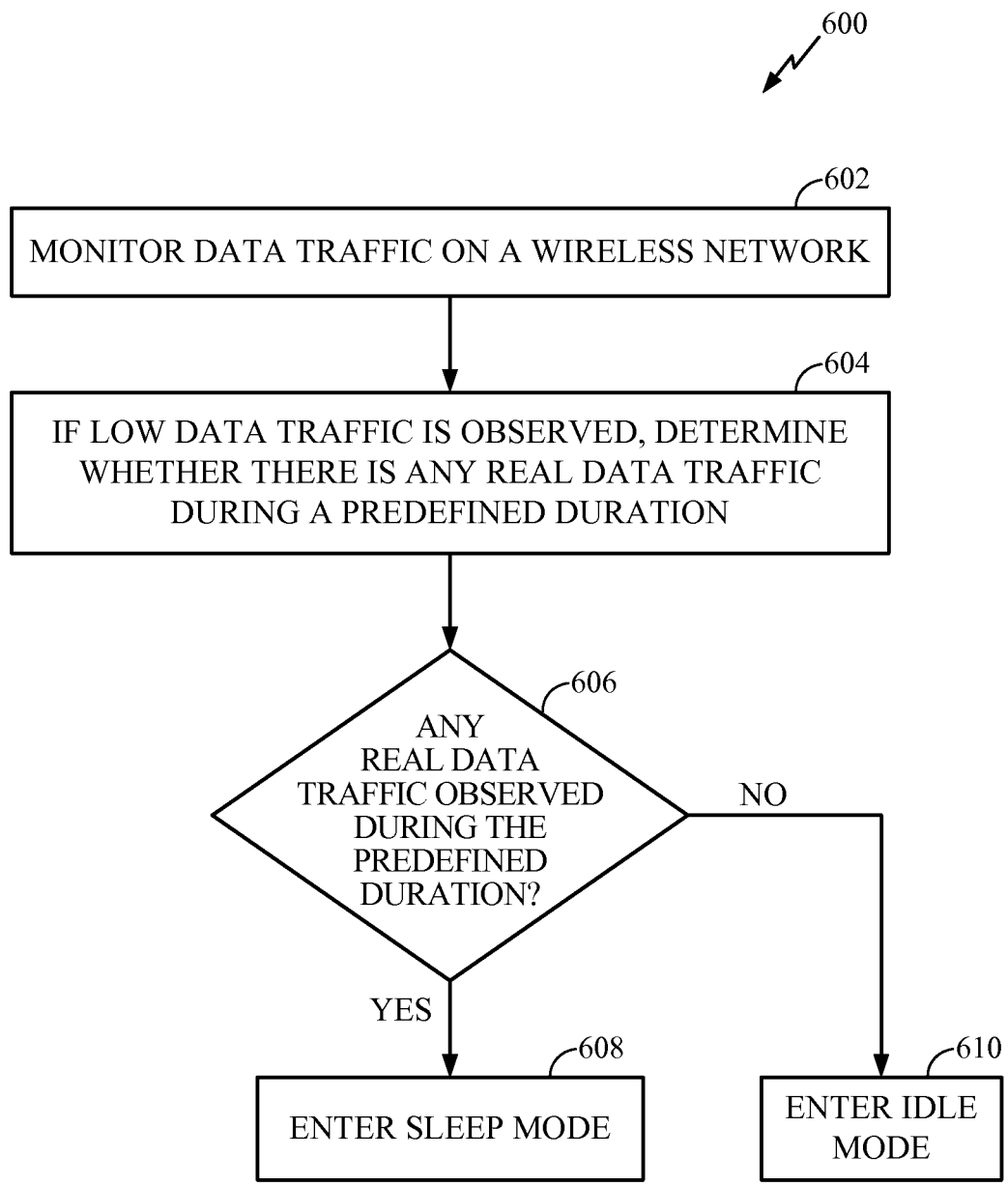
FIG. 6 illustrates example operations for selecting a power saving mode in a wireless network, in accordance with certain aspects of the present disclosure.

FIG. 6 illustrates example operations 600 for selecting a power saving mode in a wireless network, in accordance with certain aspects of the present disclosure. The operations 600 may be considered an implementation example of the more general operations 400 shown in FIG. 4.

At 602, a device (e.g., MS or BS) may monitor data traffic on the network. At 604, if low data traffic is observed, the device may determine whether there is any real data traffic during a predefined duration. At 606, the device may check to see if any real data traffic is observed during the predefined duration. At 608, the device may enter sleep mode if any real data traffic is observed during the predefined duration. At 610, the device may enter idle mode if no real data traffic is observed during the predefined duration.

According certain aspects, an MS device may initialize a timer (e.g., a sleep timer) when entering a first low power state (e.g., the sleep mode) and trigger entry of the second low power state (e.g., the idle mode) when the timer runs out.

The device may delete the sleep timer when the sleep mode is deactivated. As described earlier, the device may also initialize a counter to track size of a sleep window while the sleep timer is running, and enter the idle mode when the counter reaches a predefined threshold.

The method described herein, may allow the MS to efficiently select a power saving mode to increase its battery life. The proposed method may be used in any wireless technology that supports multiple power saving modes (e.g., WiMAX, long term evolution (LTE), ultra mobile broadband (UMB), and the like). In general, a device may have two or more power saving modes. The proposed methods may be used by a device to support any number of power saving modes.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for selecting a power saving mode of a wireless device, comprising:
    monitoring data traffic in a network;
    identifying, based on monitoring the data traffic, that a period of low overall data traffic exists;
    determining, during the identified period of low overall data traffic, if a particular type of data traffic is observed during a predetermined duration by examining one or more data traffic connection identifications (CIDs) to identify the particular type of data traffic; and
    deciding whether to trigger entry into a first low power state or a second low power state based on the determination.

2. The method of claim 1, wherein:
    the first low power state comprises a low power state in which one or more components of the wireless device are powered down; and
    the second low power state comprises a deeper low power state than the first low power state in which one or more other components of the wireless device are powered down in addition to the one or more components powered down in the first low power state.

3. The method of claim 1, wherein the particular type of data traffic comprises traffic that is not for either a management or maintenance purpose.

4. The method of claim 1, wherein deciding whether to enter the first low power state or the second low power state based on the determination comprises:
    deciding to enter the first low power state if data traffic of the particular type is observed during the predetermined duration; or
    deciding to enter the second low power state if data traffic of the particular type is not observed during the predetermined duration.

5. The method of claim 1, further comprising:
    initializing a timer when entering the first low power state; and
    triggering entry of the second low power state if the timer expires without observing data traffic of the particular type.

6. The method of claim 1, further comprising:
    initializing a counter to track a size of a sleep window associated with the first low power state; and
    entering the second low power state if the counter reaches a predetermined threshold.

7. The method of claim 6, further comprising:
    incrementing the counter each time the size of the sleep window is increased; and
    resetting the counter to zero if the size of the sleep window is decreased.

8. The method of claim 1, further comprising:
    determining a sleep ratio based at least on a size of a sleep window and a size of an available window associated with the first low power state; and
    entering the second low power state if the sleep ratio is greater than or equal to a threshold.

9. An apparatus for selecting a power saving mode of a wireless device, comprising:
    means for monitoring data traffic in a network;
    means for identifying, based on monitoring the data traffic, that a period of low overall data traffic exists;
    means for determining, during the identified period of low overall data traffic, if a particular type of data traffic is observed during a predetermined duration by examining one or more data traffic connection identifications (CIDs) to idenify the particular type of data traffic; and
    means for deciding whether to trigger entry into a first low power state or a second low power state based on the determination.

10. The apparatus of claim 9, wherein:
    the first low power state comprises a low power state in which one or more components of the wireless device are powered down; and
    the second low power state comprises a deeper low power state than the first low power state in which one or more other components of the wireless device are powered down in addition to the one or more components powered down in the first low power state.

11. The apparatus of claim 9, wherein the particular type of data traffic comprises traffic that is not for either a management or maintenance purpose.

12. The apparatus of claim 9, wherein the means for deciding whether to enter the first low power state or the second low power state based on the determination comprises:
  means for deciding to enter the first low power state if data traffic of the particular type is observed during the predetermined duration; or
  means for deciding to enter the second low power state if data traffic of the particular type is not observed during the predetermined duration.

13. The apparatus of claim 9, further comprising:
  means for initializing a timer when entering the first low power state; and
  means for triggering entry of the second low power state if the timer expires without observing data traffic of the particular type.

14. The apparatus of claim 9, further comprising:
  means for initializing a counter to track a size of a sleep window associated with the first low power state; and
  means for entering the second low power state if the counter reaches a predetermined threshold.

15. The apparatus of claim 14, further comprising:
  means for incrementing the counter each time the size of the sleep window is increased; and
  means for resetting the counter to zero if the size of the sleep window is decreased.

16. The apparatus of claim 9, further comprising:
  means for determining a sleep ratio based at least on a size of a sleep window and a size of an available window associated with the first low power state; and
  means for entering the second low power state if the sleep ratio is greater than or equal to a threshold.

17. An apparatus for selecting a power saving mode of a wireless device, comprising:
  at least one processor configured to monitor data traffic in a network, identify, based on monitoring the data traffic, that a period of low overall data traffic exists, determine, during the identified period of low overall data traffic, if a particular type of data traffic is observed during a predetermined duration by examining one or more data traffic connection identifications (CIDs) to identify the particular type of data traffic, and decide whether to trigger entry into a first low power state or a second low power state based on the determination; and
  a memory coupled with the at least one processor.

18. A computer program product comprising a non-transitory computer readable medium having instructions stored thereon, the instructions executable by one or more processors for:
  monitoring data traffic in a network;
  identifying, based on monitoring the data traffic, that a period of low overall data traffic exists;
  determining, during the identified period of low overall data traffic, if a particular type of data traffic is observed during a predetermined duration by examining one or more data traffic connection identifications (CIDs) to identify the particular type of data traffic; and
  deciding whether to trigger entry into a first low power state or a second low power state based on the determination.

* * * * *